United States Patent [19]

England

[11] Patent Number: 4,797,592
[45] Date of Patent: Jan. 10, 1989

[54] DYNAMO ELECTRIC MACHINE WITH UPWARDLY SHIFTED RIPPLE FREQUENCY

[75] Inventor: Thomas R. England, Blacksburg, Va.

[73] Assignee: Kollmorgen Technologies Corporation, Dallas, Tex.

[21] Appl. No.: 389,481

[22] Filed: Jun. 17, 1982

[51] Int. Cl.⁴ .............................................. H02K 23/06
[52] U.S. Cl. ................................. 310/154; 310/254
[58] Field of Search ............... 310/184, 180, 46, 171, 310/181, 187, 218, 155, 169, 170, 40 R, 258, 177, 207, 254, 259

[56] References Cited

U.S. PATENT DOCUMENTS

| | | | |
|---|---|---|---|
| 2,374,728 | 5/1941 | Bone | 310/154 |
| 2,456,701 | 12/1948 | Hansen | 310/154 |
| 2,513,226 | 6/1950 | Wylie | 310/154 |
| 2,717,969 | 9/1955 | Buchhold | 310/154 |
| 2,835,834 | 5/1958 | Steinegger | 310/154 |
| 2,978,598 | 4/1961 | Kato | 310/154 |
| 3,064,147 | 11/1962 | Porter | 310/40 R |
| 3,296,471 | 1/1967 | Cochardt | 310/154 |
| 3,488,836 | 1/1970 | Wheeler | 310/154 |
| 3,567,979 | 3/1971 | Jaffe | 310/154 |

*Primary Examiner*—R. M. Skudy
*Attorney, Agent, or Firm*—Morgan & Finnegan

[57] ABSTRACT

A rotary electric dynamo machine in which the ripple component in the output occurs at a higher frequency. One half of the pole faces have a nonuniform airgap while the other half have a uniform air gap and cover a noninteger slot distance. The armature has an odd number of slots. Instead of the usual ripple component at the slot frequency, a dynamo constructed as described above, surprisingly, has a predominant ripple component at twice the slot frequency.

7 Claims, 2 Drawing Sheets

DYNAMO ELECTRIC MACHINE WITH UPWARDLY SHIFTED RIPPLE FREQUENCY

This invention relates to rotating dynamo electric machines and, more particularly, to a technique for reducing the adverse effect of ripple in the output thereof.

BACKGROUND OF THE INVENTION

DC tachometers, particularly those used in velocity servo systems, should ideally provide a smooth output signal proportional to speed without any ripple. Unfortunately, a significant ripple component is usually present at a frequency corresponding to the slot frequency, i.e., the frequency corresponding to the movement of armature slots past a particular point on the stator. To avoid instability and other problems in the servo loop, the bandwidth of the servo amplifier must be limited to safely reject or attenuate the ripple frequency in the normal operating range of the system. As a result, the frequency of the ripple component limits the frequency response of the servo system.

DC motors similarly have a ripple component in the output which appears in the form of a ripple torque in the motor output. If the motor is part of a servo system, the ripple torque will often affect the speed and, hence, be reflected in the velocity feedback signal for the servo loop. The ripple torque component, in general, is undesirable since it tends to create an undesired oscillation in the motor torque output.

An object of this invention is to provide a tachometer or motor in which the ripple component apppears in a form having less of an adverse effect than in previous dynamo electric devices.

SUMMARY OF THE INVENTION

In the tachometers or motors constructed in accordance with this invention the predominant ripple component is shifted up in frequency and therefore has less of an adverse effect on the operating system.

In a velocity servo system the amplifier passband is generally designed to be safely below the predominant ripple frequency present in the normal tachometer output. As a result, the ripple frequency limits the amplifier bandpass and, hence, the frequency response of the servo system. An upward shift in the frequency of the ripple component permits a higher amplifier bandpass and therefore the higher frequency response in the servo system. Thus, by shifting the frequency of the ripple component upwardly, the adverse effect of the ripple component is reduced.

Likewise, in motors, an upward shift of the frequency of the ripple torque is desirable. In general, electric motors are less responsive mechanically to ripple torques at higher frequencies, and therefore the ripple torque has less adverse effect as the frequency increases. Also, in servo systems, as the ripple torque frequency increases the servo amplifier bandpass can be increased since the effect in the feedback signal of the servo loop occurs at a higher frequency.

The DC motor or tachometer according to this invention is constructed using a consequent pole and block magnet stator assembly to provide the magnetic field. The block magnets provide flat pole face surfaces with a non-uniform airgap relative to the armature. The faces of the consequent poles are contoured to provide a substantially uniform airgap with respect to the armature. The consequent poles span a non integer slot distance. Preferably, the consequent poles each span a portion of the armature corresponding to an integer number of slots plus one half a slot width. The number of slots in the armature is odd.

Surprisingly, this combination of parameters results in a predominant ripple component at twice the normal slot frequency. Although the reason for the upward shift in the frequency of the ripple component is not fully understood, it appears to result from a shifting of the net effective consequent pole center at a rate dependent upon the speed of the armature slot movement.

SUMMARY OF THE DRAWINGS

Apparatus constructed in accordance with the invention is described in greater detail with reference to the drawings which form part of this specification and in which.

DETAILED DESCRIPTION OF THE DRAWINGS

Figure 1:
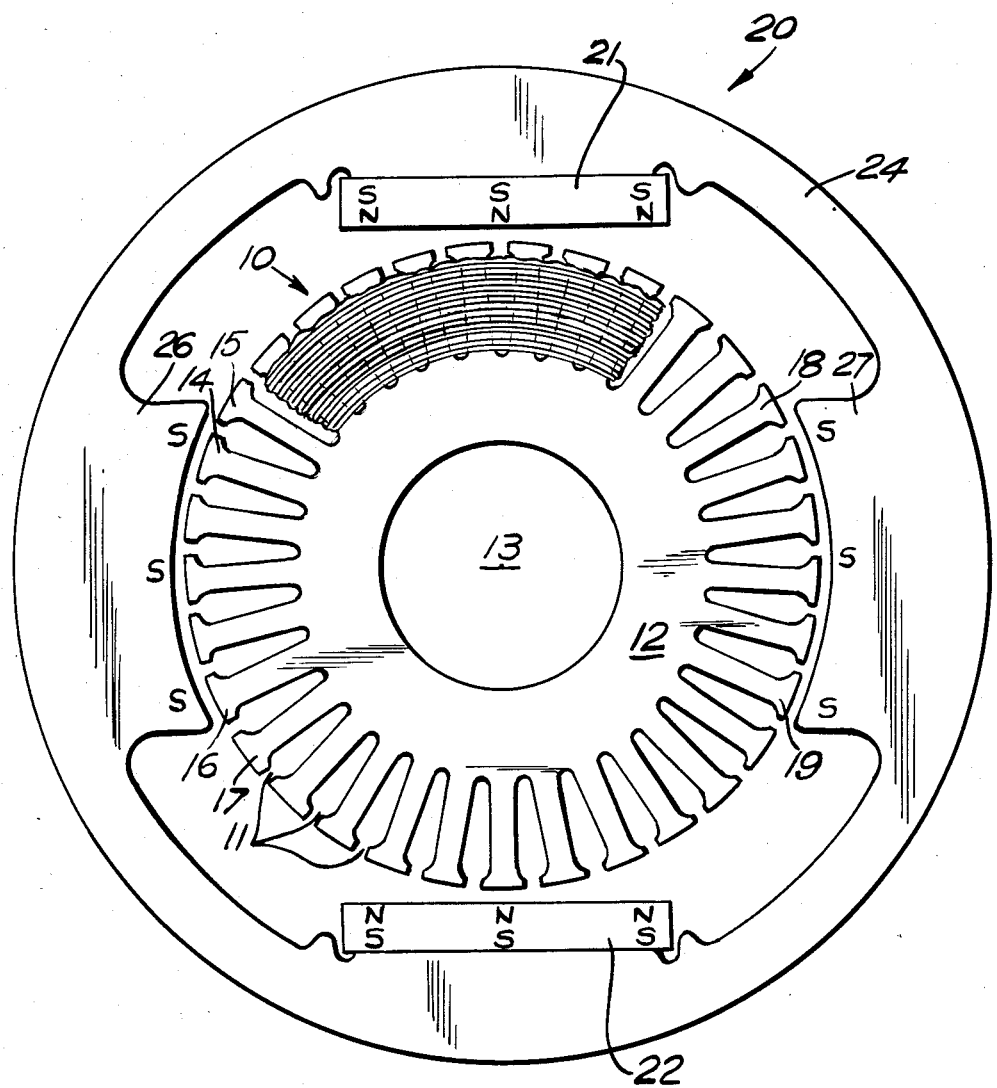
FIG. 1 is a cross-sectional view of a tachometer constructed in accordance with this invention in which part of the armature windings have been removed for clarity of illustration.

The tachometer illustrated in FIG. 1 includes a rotating armature 10 and a stator 20. The stator provides the magnetic field for the tachometer.

For simplicity of illustration, the rotor is shown with most of the armature windings removed to expose the armature slots 11. The armature core structure 12 is made of magnetic material, typically laminated steel. The laminations are stamped in a configuration to provide an odd number of slots. The armature specifically shown in FIG. 1 is o illustrated with 33 slots. The armature windings are in a wave wound, four pole configuration and are connected to a commutator (not shown) in the usual fashion.

The stator structure includes two block magnets 21 and 22 which are permanent magnets positioned to provide a north pole on the side toward the armature and a south pole on the opposite side. The magnets are mounted in a ring of magnetic material 24 shaped to provide two consequent pole pieces 26 and 27. With this arrangement the permanent magnets provide the north pole faces and consequent pole pieces 26 and 27 provide the south pole faces.

The permanent magnets can be of any desirable type. Since the magnets are in a simple block form and have no complex shapes, magnets made from materials that are difficult to shape or machine can easily be used. High energy samarium cobalt magnets provide excellent results.

The airgaps associated with the flat pole faces at the surfaces of magnets 21 and 22 are intentionally nonuniform, i.e., are not shaped to conform to the arcuate surface of the armature. As a result, the air gap flux density is greatest at the center of the magnets and decreases toward the ends of the magnets.

The consequent poles, on the other hand, are shaped to provide a substantially uniform airgap across the span of the pole face. Furthermore, the widths of the pole face for the consequent poles is intentionally different from the integer slot distance. In FIG. 1, for example, the upper edge of pole piece 26 is aligned with the center of tooth 15 whereas the lower edge of the same pole piece is aligned with the slot between teeth 16 and 17. Thus, the pole face spans a portion of the armature surface corresponding to five and one half slots. Similarly pole piece 27 is seen to have an upper edge aligned with the center of tooth 18 whereas the lower edge is aligned with the slot adjacent tooth 19, and, hence, this consequent pole face likewise spans a distance of five and one half armature slots.

Normally a DC tachometer output signal includes a predominant ripple component at the slot frequency, i.e., the frequency corresponding to the rate at which the slots pass a particular point on the stator. When a tachometer constructed in accordance with the forgoing description was tested, however, the predominant ripple component was, surprisingly, found to occur at twice the slot frequency.

The reason for the unexpected upward shift in frequency is not exactly known. However, it appears to be due to the manner in which the net effective center of the consequent poles move during the operation of the tachometer. This can best be seen by a comparison of FIGS. 1 and 2 which show the armature in positions displace from one another by one half a slot pitch.

For the armature position shown in FIG. 1 armature teeth 15 and 18 are centered under the edges of the respective consequent pole pieces. Rotor teeth 16 and 19, are completely covered by the consequent pole faces. In this position the magnetic flux pattern between the pole face and the armature teeth is such that the net center of the consequent pole is shifted upwardly toward teeth 15 and 18.

Figure 2:
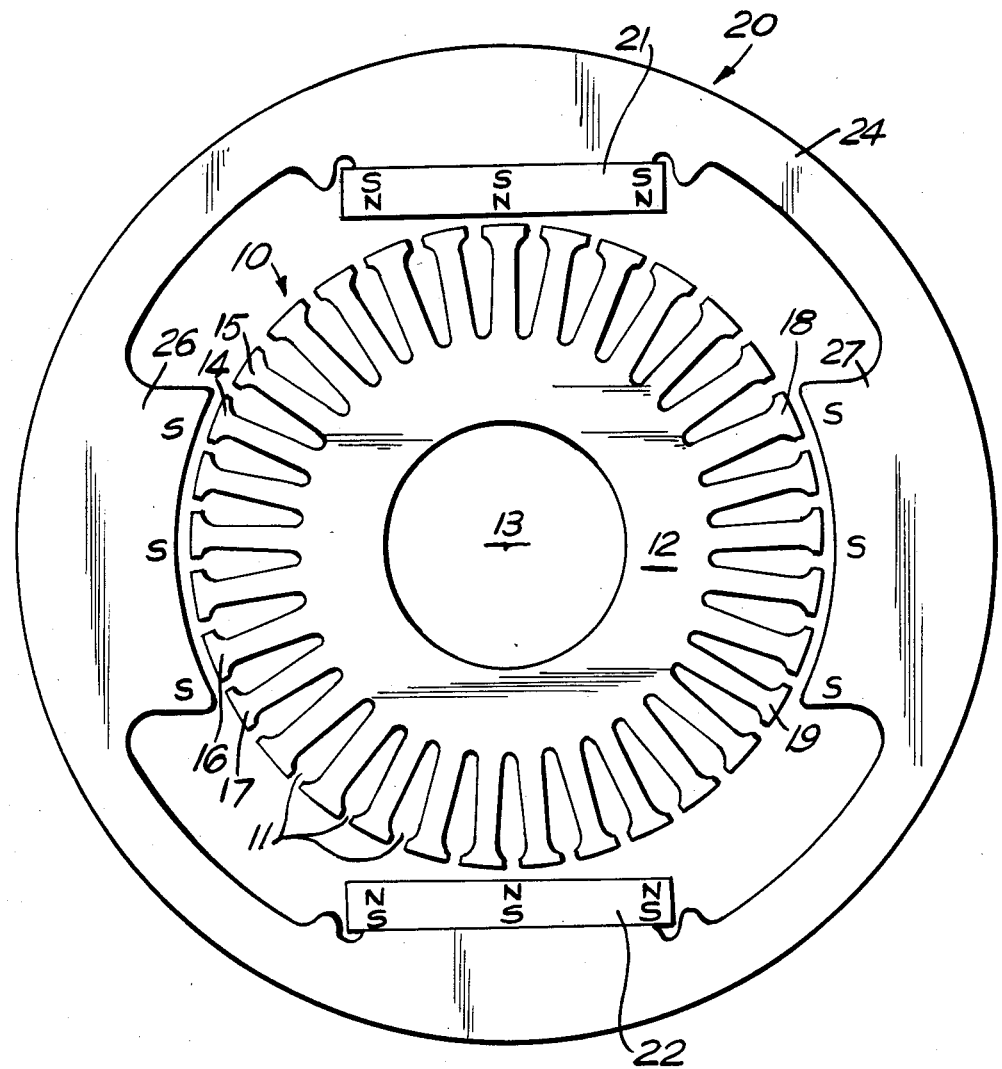
FIG. 2 is a similar illustration of the tachometer in accordance with this invention wherein the armature is shown advanced by one half a slot pitch.

In FIG. 2 the armature is shown advanced by one half slot pitch. Tooth 18 is now completely covered by the pole face whereas tooth 19 has advanced and is now only half covered o by the pole face. On the other side, tooth 17 is now half way covered by the pole face whereas tooth 15 is moved out from under the pole face completely. In this position, the net centers of the consequent poles have moved downwardly toward teeth 17 and 19.

Accordingly, it can be seen that the net effective centers of the consequent poles move up and down together as lo the armature rotates. It is believed that this movement of the net effective consequent poles has the effect of upwardly shifting the frequency of the predominant ripple component appearing in the tachometer output signal.

Although the foregoing description has been with reference to a tachometer, DC motors can be constructed in a similar fashion. With a motor instead of an upward shift in the predominant ripple frequency in the output voltage, the upward shift appears in the predominant ripple torque appearing at the motor output.

While only one specific embodiment of the invention has been described in detail, it should be apparent to those skilled in the art that there are numerous variations within the scope of this invention. The invention is more particularly defined in the appended claims.

I claim:

1. In a rotary dynamo electric machine the combination of
   a rotor including
      winding slots,
      armature windings located in said slots, and
      commutating means connected to said windings;
   a stator including
      at least one permanent magnet providing a pole face with a nonuniform airgap relative to said rotor,
      at least one pole face provided by a consequent pole, said pole face of said consequent pole spanning a distance on the surface off said rotor different from the integer slot distance, and means including said permanent magnet for generating magnetic flux at said pole faces; and
   wherein said permanent magnet is in a block form providing a flat pole face surface to provide said nonuniform airgap relative to said rotor.

2. In a rotary dynamo electric machine the combination of
   a rotor including
      winding slots,
      armature windings located in said slots, and
      commutating means connected to said windings;
   a stator including
      at least one permanent magnet providing a pole face with a nonuniform airgap relative to said rotor,
      at least one pole face provided by a consequent pole, said pole face of said consequent pole spanning a distance on the surface off said rotor different from the integer slot distance, and means including said permanent magnet for generating magnetic flux at said pole faces; and
   wherein said pole face with a substantially uniform airgap is a consequent pole and wherein said consequent pole face spans an integer slot distance plus one half a slot distance.

3. In a rotary dynamo electric machine, the combination of
   a rotor including
      an odd number of winding slots,
      armature windings located in said slots, and
      commutating means connected to said windings; and
   a stator including
      at least one pole face with a nonuniform airgap relative to said rotor,
      at least one pole face with a substantially uniform airgap relative to said rotor, and
      means for generating magnetic flux at said pole faces.

4. A dynamo electric machine in accordance with claim 3 wherein said means includes at least one permanent magnet.

5. A dynamo electric machine in accordance with claim 4 wherein said permanent magnet is in a block form providing a flat pole face surface to provide said nonuniform airgap relative to said rotor.

6. A dynamo electric machine in accordance with claim 4 wherein said pole face with a substantially uniform air gap is provided by a consequent pole.

7. In a dyamo electric machine the combination of
   a rotor including
      winding slots,
      armature windings located in said slots, and
      commutating means connected to said windings;
   a stator including
      at least one permanent magnet providing a pole face with a nonuniform airgap relative to said rotor,
      at least one pole face provided by a consequent pole, said pole face of said consequent pole spanning a distance on the surface off said rotor different from the integer slot distance, and means including said permanent magnet for generating magnetic flux at said pole faces; and
   wherein said pole face of said consequent pole has a substantially unform airgap relative to said rotor and spans an integer slot pitch plus one half a slot pitch.

* * * * *